United States Patent [19]

Kimura et al.

[11] 3,793,206

[45] Feb. 19, 1974

[54] PIEZOELECTRIC SINGLE CRYSTAL

[75] Inventors: Masakazu Kimura; Kikuo Doi; Satoshi Nanamatsu, all of Tokyo, Japan

[73] Assignee: Nippon Electric Company, Limited, Tokyo, Japan

[22] Filed: Oct. 11, 1972

[21] Appl. No.: 296,652

[30] Foreign Application Priority Data

Oct. 14, 1971 Japan .............................. 46-81487

[52] U.S. Cl. .............................. 252/62.9, 423/598

[51] Int. Cl. . C04b 35/16, C04b 35/46, C01g 23/00

[58] Field of Search .................... 252/62.9; 423/598

[56] References Cited

OTHER PUBLICATIONS

Blasse, "Journal of Inorganic and Nuclear Chemistry", Vol. 30, pp. 2,283–2,284, 1968.

*Primary Examiner*—Oscar R. Vertiz

*Assistant Examiner*—J. Cooper

*Attorney, Agent, or Firm*—Nichol M. Sandoe

[57] ABSTRACT

A piezoelectric single crystal is composed of a solid solution of barium oxide (BaO), germanium dioxide ($GeO_2$), and titanium dioxide ($TiO_2$), having a composition expressed by the formula: $(BaO)x \cdot (GeO_2)Y \cdot (TiO_2)z$; where $1.8 \leq x \leq 2.2$, $1.8 \leq Y \leq 2.2$, $0.9 \leq z \leq 1.1$; and $x + y + z = 5$.

3 Claims, No Drawings

PIEZOELECTRIC SINGLE CRYSTAL

The present invention relates generally to piezoelectric crystals, and more particularly to an improved piezoelectric single crystal.

At present, the most widely employed piezoelectric single crystal is rock crystal, which because of its versatility, is still widely used in many areas of technology. The piezoelectric activity of rock crystal is, however, relatively low; and when it is evaluated in terms of its electromechanical coupling coefficient, (regarded in the art as the most basic constant for representing piezoelectricity) rock crystal is rated at as low as about 10 percent.

In view of this drawback of rock crystal as a piezoelectric single crystal, a considerable amount of research has been carried out in an attempt to obtain single crystals that have improved piezoelectricity by synthesizing new types of single crystals. Among the more signficiant results of these attempts is the synthesization of piezoelectric single crystals such as lithium niobate ($LiNbO_3$), lithium tantalate ($LiTaO_3$), and lithium metagallate ($LiGaO_2$). While these single crystals are superior to rock crystal with respect to their electromechanical coupling coefficient, further improvement in the piezoelectric properties of single crystals is still needed.

It is an object of the invention to provide a novel and improved piezoelectric single crystal.

It is a further object of the invention to provide an improved piezoelectric single crystal having an increased electromechanical coupling coefficient.

The present invention, which constitutes an approach that is significantly different in nature from those that have heretofore been proposed, is based on the new finding that a single crystal in the form of a solid solution consisting of barium oxide (BaO), germanium dioxide ($GeO_2$) and titanium dioxide ($TiO_2$) and having a composition expressed by the formula: $(BaO)x \cdot (GeO_2)y \cdot (TiO_2)z$, where $1.8 \leq x \leq 2.2$, $1.8 \leq y \leq 2.2$, $0.9 \leq z \leq 1.1$, and $x + y + z = 5$, manifests excellent piezoelectricity that is far better than that of rock crystal, and has an electromechanical coupling coefficient of higher than 30 percent. The typical composition of the single crystal of this invention may be represented as $Ba_2Ge_2TiO_8$.

Few reports have been made in the past with respect to a composition having the formula $(BaO)x \cdot (GeO_2)y \cdot (TiO_2)z$ where $1.8 \leq x \leq 2.2$, $1.8 \leq y \leq 2.2$, $0.9 \leq z \leq 1.1$, and $x + y + z = 5$. The only such reports that are known to applicants are Masse and Durif, Bull. Soc. Franc. Min. Crist., 90, 407–408 (1967) and G. Blasse, J. Inorg. Nucl. Chem., vol. 30, pp. 2,283–2,284 (1968), reporting the fluorescence of a composition expressed by the formula $(BaO)2 \cdot (GeO_2)2 \cdot (TiO_2)1$, or $Ba_2Ge_2TiO_8$, in a ceramic form. There is, however, no available report or proposal concerning the production or piezoelectricity of this composition in the form of a single crystal.

The invention is now described in detail by way of examples.

Barium carbonate ($BaCO_3$), germanium dioxide ($GeO_2$), and titanium dioxide ($TiO_2$), all in pulverized form and having a purity of greater than 99.5 percent, were used as the starting materials for obtaining the single crystal of the invention. These materials were weighed so that the molar ratio of $BaCO_3$, $GeO_2$, and $TiO_2$ is 2 : 2 : 1. The materials were mixed in a ball mill for 24 hours, and thereafter sintered at a temperature of 1,050°C for 3 hours.

The sintered powdery mixture was then charged into an end-pointed platinum crucible and melted at a temperature of 1,350°C. Thereafter, the crucible was subjected to gradual cooling from its end for effecting single-crystallization, according to Bridgman's method, one of the known single-crystal preparation methods. Crystal growth at a rate of 0.32 mm/hr under a temperature gradient of 50°C/cm resulted in a colorless transparent single crystal measuring about 10 mm in diameter and about 20 mm in length. Composition variation within 10 percent for each value from the stoichiometrical molar ratio of 2 : 2 : 1 for BaO, $GeO_2$, and $TiO_2$ in the final product posed no problem in achieving single-crystallization under the above-described conditions, but any other ratio beyond this range would cause excessive separation of different phases and make it impossible to prepare the desired single-crystallization.

Observation of the orthoscopic figure of the thus obtained single crystal with a polarizing microscope revealed uniform single crystal structure. Also, an X-ray analysis revealed that the crystal is of the orthorhombic system and belongs to the point group of the $C_{2v}$ type. The density of the single crystal as measured was 4.84 g/cm$^3$. This single crystal is both chemically and physically stable, and can be readily cut and polished in ordinary ways and is also easy to handle. The piezoelectric and dielectric properties of this single crystal were measured to obtain the results set out below. The setting of the piezoelectric axes was based on the IRE standard.

1. Piezoelectric properties

The piezoelectric properties of the single crystal of the invention that were measured were the electromechanical coupling coefficient ($k$) in the thickness shear mode or length extensional mode, and the temperature coefficient ($T_{fr}$) of resonance frequency. For measurement in the thickness shear mode, plate-shaped specimens cut in an orientation indicated as $(XZ1)\theta$ in the IRE standard, were used, while using a Z-bar for measuring in the length extensional mode.

The first letter in the parenthesis of the notation $(XZ1)\theta$ indicates the direction of thickness of a plate of a resonator in the reference position at which the plate is initially located for regulating the orientation of the plate, the second letter indicates the lengthwise direction of the vibrator plate in that position, and the third letter signifies the axis of rotation given to the plate from the reference position.

First, the initial direction of thickness of the plate is set to coincide with the X-axis, and the lengthwise direction of the plate is set to coincide with the Z-axis. The plate, which is thus placed at the reference position is then given a rotation through an angle $\theta$ about the edge line in the lengthwise direction of the plate. The resultant position of the plate has an orientation expressed as $(XZ1)\theta$. The plus sign for the angle of rotation $\theta$ signifies counter-clockwise rotation. The $(XZ1)\theta$ plates used for the measurement were four pieces, for which $\theta$ was respectively 0°, 27°, 63°, and 90°. The size of each plate was approximately 6 mm × 5 mm in area and 0.4 mm in thickness. Gold was evaporated on the main face of each plate to be used as electrodes. The Z-bar used was approximately 2 mm × 2 mm × 5 mm, and gold was evaporated on the Z-faces to serve as electrodes. The temperature range used for the measurements was from −20° to +80°C. The results of these measurement are shown in Table 1 below.

TABLE 1

| Specimen | k | $T_{fr}$ (ppm/°C) |
|---|---|---|
| (XZ1)0° | 0.27 | −150 ± 100 |
| (XZ1)27° | 0.29 | −110 ± 40 |
| (XZ1)63° | 0.31 | −20 ± 5 |
| (XZ1)90° | 0.30 | −25 ± 5 |
| Z-bar | 0.07 | −50 ± 5 |

(Note) The frequency constant of the thickness shear mode was about 1,100 Hz.m.

2. Dielectric properties

X-, Y- and Z-plates of about 3 mm × 4 mm and about 1 mm in thickness were sliced out from the grown crystal, and silver paste was applied at room temperature on the main faces of each plate. The dielectric constants and the D-E relation were measured at room temperature in the directions of the X-, Y- and Z- axes. The dielectric constant was measured at 1 KHz and the D-E relation was measured at 50 Hz. The temperature dependency of the dielectric constant was measured at 1 MHz by using ceramic specimens having the composition of the invention. The obtained results were as follows:

1. the dielectric constants measured at room temperature and at 1 KHz were 20 for $\epsilon_{11}$, 20 for $\epsilon_{22}$, and 13 for $\epsilon_{33}$;

2. electric fields of up to 35 Kv/cm and up to 37 Kv/cm were applied in the X- and Y-directions and in the Z-direction, respectively, but no D-E hysteresis loop was observed;

3. the dielectric constants were measured within the temperature range of from 25°C to 900°C for ceramic specimens, but no dielectric anomaly was found.

These results of the dielectric measurements attest that the obtained crystal is a paraelectric substance. Thus, the single crystal of the invention, although being a paraelectric substance, has an electromechanical coupling coefficient in the thickness shear mode of about 30 percent and the temperature coefficient of resonance frequency of that single crystal is as good as about −25 ppm/°C at temperatures near room temperature. These results indicate that the single crystal of the invention can be effectively used as a piezoelectric material in electric wave filters, delay lines, transducers, acoustic apparatus, and the like, as well as in light modulators, frequency converters, and the like.

Although the invention has been herein specifically described with respect to specific examples thereof, it will be apparent that modifications can be made therein, all without departing from the spirit and scope of the invention.

What is claimed is:

1. A piezoelectric single crystal in the form of a solid solution of barium oxide (BaO), germanium dioxide ($GeO_2$), and titanium oxide ($TiO_2$), having the composition expressed by the formula: $(BaO)x \cdot (GeO_2)y \cdot (TiO_2)z$, where $x + y + z = 5$; and where $x$, $y$, and $z$ are given as follows: $1.8 \leq x \leq 2.2$, $1.8 \leq y \leq 2.2$, and $0.9 \leq z \leq 1.1$.

2. The single crystal of claim 1, having the composition $Ba_2Ge_2TiO_8$.

3. The single crystal of claim 1, having an electromechanical coupling coefficient of at least 30 percent.

* * * * *